US011692947B2

(12) United States Patent
Ono et al.

(10) Patent No.: US 11,692,947 B2
(45) Date of Patent: Jul. 4, 2023

(54) DIE BONDING APPARATUS AND MANUFACTURING METHOD FOR SEMICONDUCTOR DEVICE

(71) Applicant: Fasford Technology Co., Ltd., Minami-Alps (JP)

(72) Inventors: Yuta Ono, Minami-Alps (JP); Hideharu Kobashi, Minami-Alps (JP); Koji Hosaka, Minami-Alps (JP); Masaaki Yoshiyama, Minami-Alps (JP)

(73) Assignee: Fasford Technology Co., Ltd., Minami-Alps (JP)

( * ) Notice: Subject to any disclaimer, the term of this patent is extended or adjusted under 35 U.S.C. 154(b) by 100 days.

(21) Appl. No.: 17/378,049

(22) Filed: Jul. 16, 2021

(65) Prior Publication Data

US 2022/0034823 A1 Feb. 3, 2022

(30) Foreign Application Priority Data

Jul. 31, 2020 (JP) ................................ 2020-130329

(51) Int. Cl.
*G01N 21/95* (2006.01)
*G01N 21/88* (2006.01)
*G06T 7/00* (2017.01)

(52) U.S. Cl.
CPC ..... *G01N 21/9505* (2013.01); *G01N 21/8806* (2013.01); *G06T 7/0002* (2013.01); *G01N 2021/8825* (2013.01); *G01N 2201/063* (2013.01)

(58) Field of Classification Search
CPC .......... G01N 21/9505; G01N 21/8806; G01N 2021/8825; G01N 2201/063; G06T 7/0002
See application file for complete search history.

(56) References Cited

U.S. PATENT DOCUMENTS 4,200,393 A * 4/1980 Suzuki .................. H01L 21/681 250/548
2015/0324965 A1 11/2015 Kulkarni

FOREIGN PATENT DOCUMENTS

EP 1003212 A2 * 5/2000 ....... H01L 21/67144
JP 2017-117916 A 6/2017
JP 2020-13841 A 1/2020

(Continued)

OTHER PUBLICATIONS

Chinese-language Office Action issued in Taiwanese Application No. 110125240 dated Jul. 5, 2022 (10 pages).

*Primary Examiner* — Hung V Nguyen
(74) *Attorney, Agent, or Firm* — Crowell & Moring LLP

(57) ABSTRACT

A die bonding apparatus includes a first illumination device for irradiating a die with light along an optical axis of a photographing device, and a second illumination device that is located above the first illumination device and irradiates the die with light having a predefined angle with respect to the optical axis. The second illumination device includes a second light emitting section, and a light path control member that limits a light path of second irradiation light emitted from the second light emitting section. The second illumination device is disposed in such a way that the second irradiation light, the light path of which is limited by the light path control member, passes through the cylinder of the first illumination device, and the top surface of the die is irradiated with the second irradiation light.

18 Claims, 15 Drawing Sheets

101
102
102a
103c
103
103b
103a
D

(56) References Cited

FOREIGN PATENT DOCUMENTS

| | | | |
|---|---|---|---|
| TW | 201735209 | A | 10/2017 |
| TW | 202006849 | A | 2/2020 |

* cited by examiner

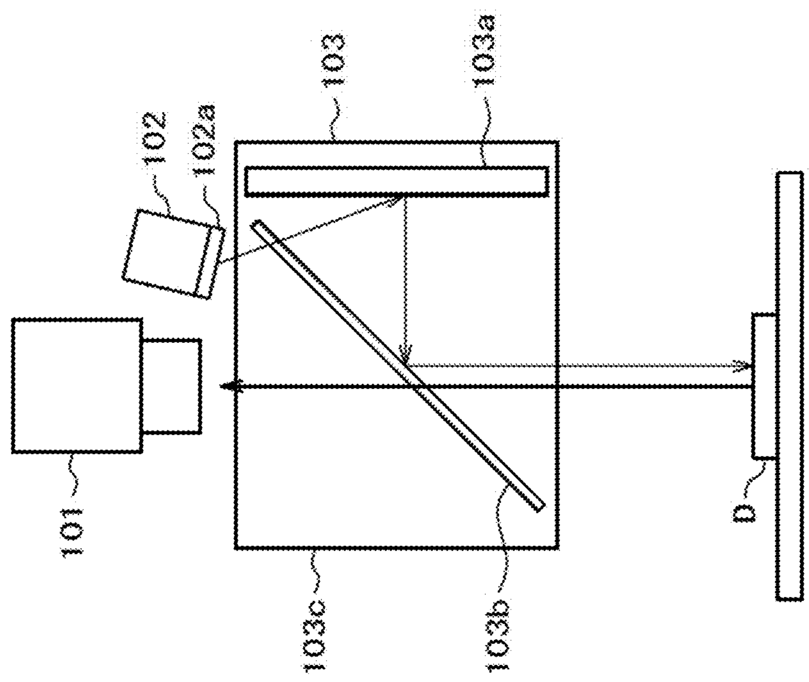
F I G . 4 B
101
102
102a
103
103a
103b
103c
D
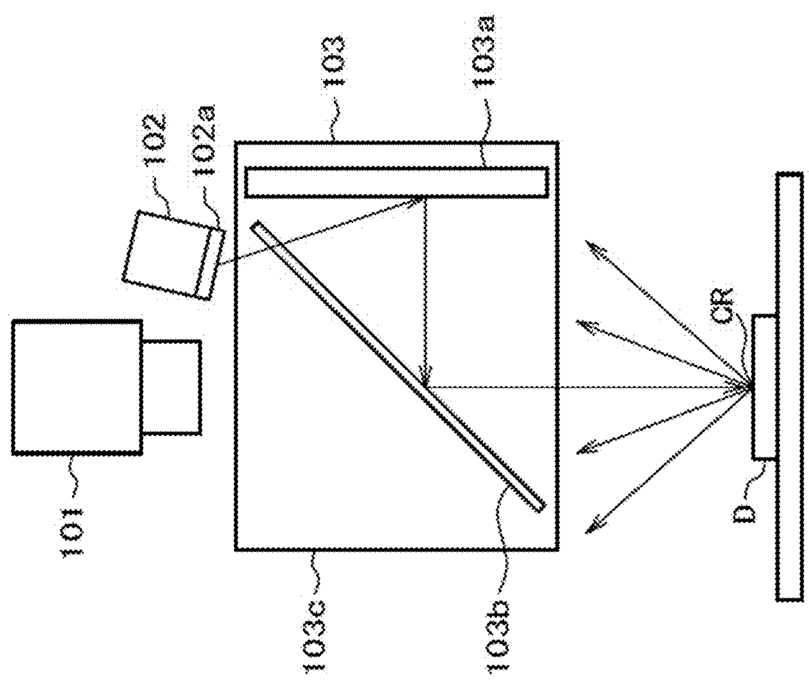
F I G . 4 A
101
102
102a
103
103a
103b
103c
CR
D 101
102
102a
104
103
103a
103b
103c
D 101
102
102a
103
103a
103b
103c
D

DIE BONDING APPARATUS AND MANUFACTURING METHOD FOR SEMICONDUCTOR DEVICE

CLAIM OF PRIORITY

The present application claims priority from Japanese patent application JP2020-130329 filed on Jul. 31, 2020, the content of which is hereby incorporated by reference into this application.

BACKGROUND

The present disclosure relates to a die bonding apparatus and, for example, the present disclosure can be applied to a die bonder with cameras that recognize a die.

A die bonding apparatus such as a die bonder is an apparatus used for bonding a semiconductor chip (hereinafter, referred to as a die for simplicity) onto a wiring substrate, a lead frame, or the like (hereinafter, referred to as a substrate for simplicity) or for bonding (mounting and attaching) a die to a die that has already been bonded using solder, rolled gold, or resin as bonding materials. In a die bonder where a die is bonded to, for example, the surface of a substrate, an operation (work) in which the die is sucked and picked up from a wafer using a suction nozzle called a collet, is transferred on the substrate, and is given a press force, and at the same time, a bonding material is heated to execute bonding, is repeatedly conducted.

Photographing is conducted with a camera using an illumination apparatus before picking up a die from a wafer and so on for appearance inspection (surface inspection) to check whether or not there is a flaw such as a crack on the die, or whether or not there are foreign materials, and for positioning of the die. In the case where an appearance inspection function and a positioning function are designed using photographed images picked up with a camera, there are two kinds of illumination configurations, one is a bright field scheme in which "a thing to be observed is darkly photographed with its background being bright", and the other is a dark field scheme in which "a thing to be observed is brightly photographed with its background being dark".

Generally speaking, the dark field scheme is better when fine flaws are checked. The surface of a wafer is analogous to a mirror surface, so in order to conduct inspection using the dark field scheme, an oblique illumination, in which a photographic subject is irradiated with light from an oblique direction with respect to the optical axis of the camera, is adopted. In the case of checking a crack, the crack easily reflects the light when the incident angle of the oblique illumination is set as near to the optical axis of the camera as possible (the incident angle is made to approach to 0 degree as much as possible). In addition, in the dark field scheme, it is required that a wafer, which is a part of the background, and the surface of a die should not reflect the light of the illumination and should not make the light enter the camera.

On the other hand, the bright field scheme is better when the positioning of a die and appearance inspection for checking whether there are foreign materials or not are conducted. In the bright field scheme, a coaxial vertical illumination or a coaxial illumination (hereinafter, named generically a coaxial illumination), in which a photographic subject is irradiated with light having the same axis as the optical axis of the camera, is adopted.

SUMMARY

In the case where only one illumination is used in an illumination apparatus that is equipped both oblique illumination and coaxial illumination, there is a fear that mutual interference will occur between the oblique illumination and the coaxial illumination.

The problem of the present disclosure is how to provide a technology that can decrease mutual interference between the coaxial illumination and the oblique illumination.

The outline of a typical die bonding apparatus included in the present disclosure is described as follows. To put it concretely, the die bonding apparatus includes a first illumination device for irradiating a die with light along an optical axis of a photographing device, and a second illumination device that is located above the first illumination device and irradiates the die with light having a predefined angle with respect to the optical axis. The second illumination device includes a second light emitting section, and a light path control member that limits a light path of second irradiation light emitted from the second light emitting section. The second illumination device is disposed in such a way that the second irradiation light, the light path of which is limited by the light path control member, passes through the cylinder of the first illumination device, and the top surface of the die is irradiated with the second irradiation light.

According to the abovementioned die bonding apparatus, it is possible to reduce influence that is given on the oblique illumination by the coaxial illumination.

BRIEF DESCRIPTION OF THE DRAWINGS

FIG. 4A and FIG. 43 are diagrams each of which shows a light path that illuminates the light emitting section of the coaxial illumination among the light paths of the oblique illumination shown in FIG. 2;

DESCRIPTION OF THE PREFERRED EMBODIMENTS

Figure 1B:
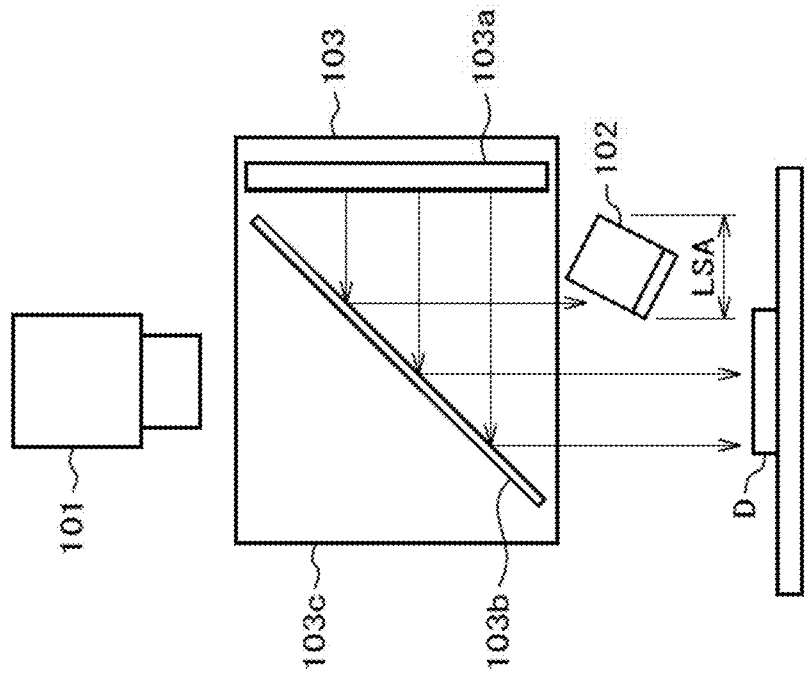
FIG. 1B is a diagram showing the disposition of a camera and a coaxial illumination for die positioning.

Hereinafter, an embodiment and an example will be explained with reference to the accompanying drawings. Here, in the following descriptions, the same components are given the same reference signs, and redundant explanations about the same components will be omitted in some cases. Furthermore, there are some cases where, in order to make the descriptions clearer, the widths, thicknesses, shapes, and the like of respective portions of the embodiment and example are schematically depicted differently from what those really are in the drawings, but these depictions show only schematic examples, so that the interpretation of the present disclosure is not limited to these depictions.

Figure 1A:
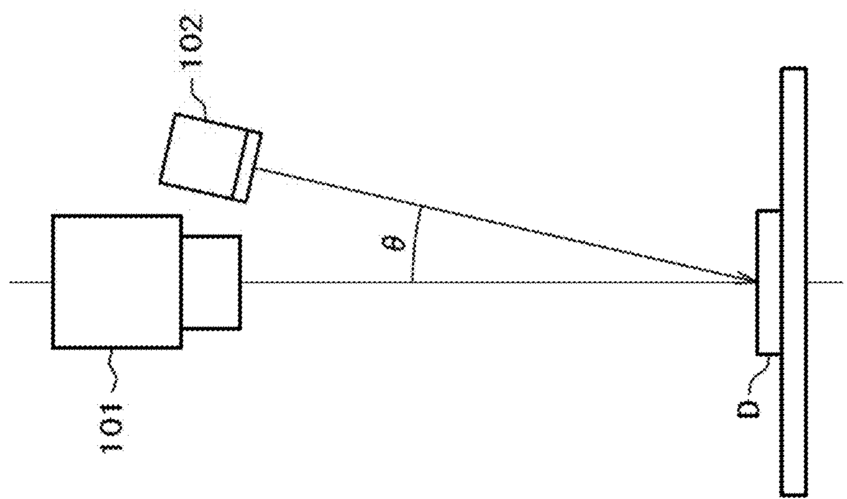
FIG. 1A is a diagram showing the disposition of a camera and an oblique illumination for die crack inspection.

A technology that the disclosers have examined prior to this disclosure will be explained with reference to FIG. 1A, FIG. 1B, and FIG. 2 to FIG. 5. FIG. 1A is a diagram showing the disposition of a camera and an oblique illumination for die crack inspection. FIG. 1B is a diagram showing the disposition of a camera and a coaxial illumination for die positioning.

As described above, in the case where a crack on the surface of a die D is checked, it is preferable that an oblique illumination 102 should be used so that the incident angle (θ) of light from the oblique illumination 102 in respect to the light axis of a camera 101 is made to approach to 0 degree as much as possible as shown in FIG. 1A under the condition that the background of the photographing does not become a bright field, resulting in the unevenness of brightness in the relevant check region being suppressed.

On the other hand, a die bonding apparatus needs illumination for positioning a die D in addition to the illumination for crack inspection, and it is preferable that, in order to make the die bonding apparatus robust over a deflection and a warp of the surface of the die, a coaxial illumination 103, the irradiation range of which is larger than the view field of the camera 101 and the light emitting section 103*a* of which includes a plane light emitting source, should be used as shown in FIG. IB. The coaxial illumination 103 includes a mirror cylinder 103*c* that is a cylinder with a half mirror (semi-transmissive mirror) 103*b* inside as well as the light emitting section 103*a*.

In order to install the oblique illumination 102 in an optical system with the coaxial illumination 103 for die positioning so that the incident angle of the oblique illumination 102 is made to approach to 0 degree as much as possible, if the oblique illumination 102 is installed below the coaxial illumination 103 as shown in FIG. IB, a light-shielded area LSA where irradiation light of the coaxial illumination 103 is blocked by the oblique illumination 102 has to appear. Herewith, the irradiation area of the coaxial illumination 103 is narrowed, so that the robustness over a warp of the die D becomes impaired. Therefore, it is preferable that the oblique illumination 102 should be installed above the coaxial illumination 103.

Figure 2:
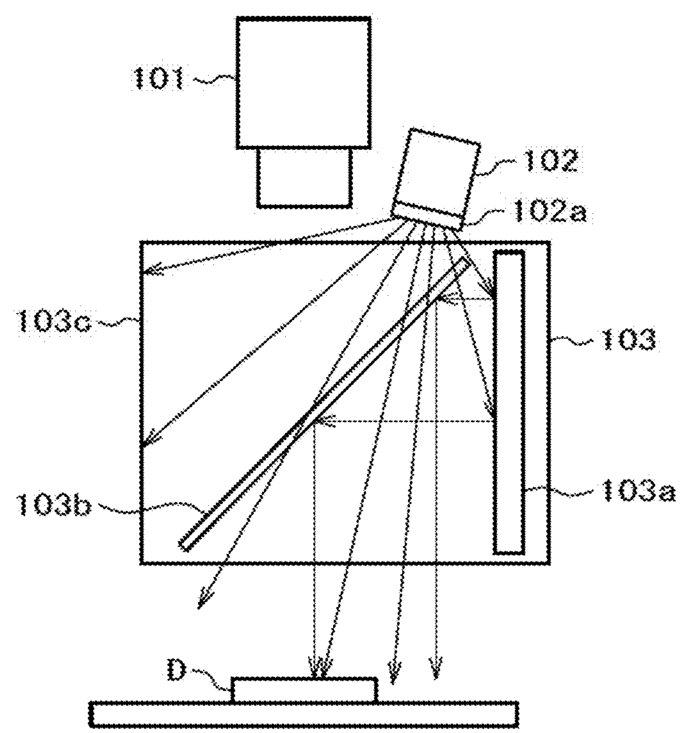
FIG. 2 is a diagram showing the light paths of the oblique illumination in the case where the oblique illumination is disposed above the coaxial illumination.
Figure 3B:
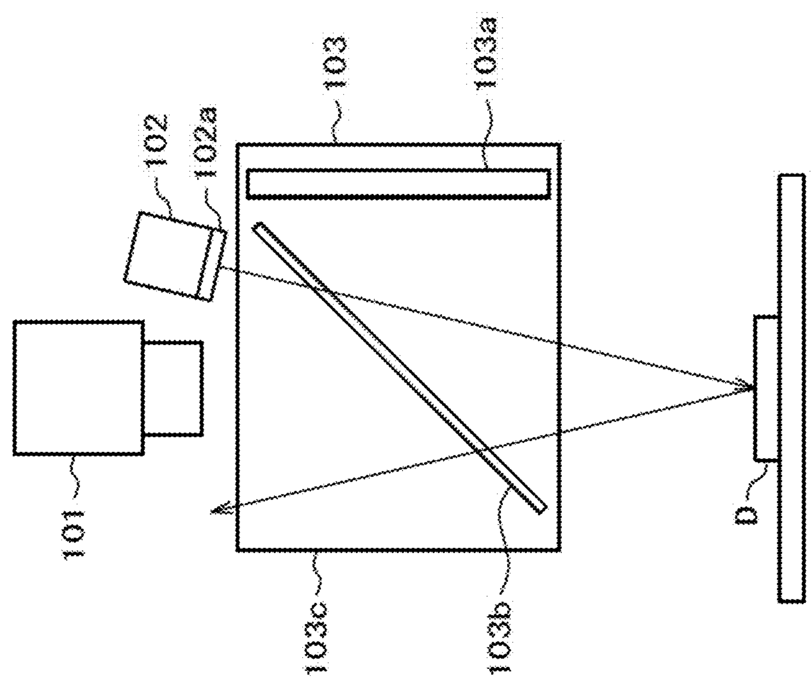
FIG. 3A and FIG. 3B are diagrams each of which shows a light path that passes through a half mirror among the light paths of the oblique illumination shown in FIG. 2.
Figure 3A:
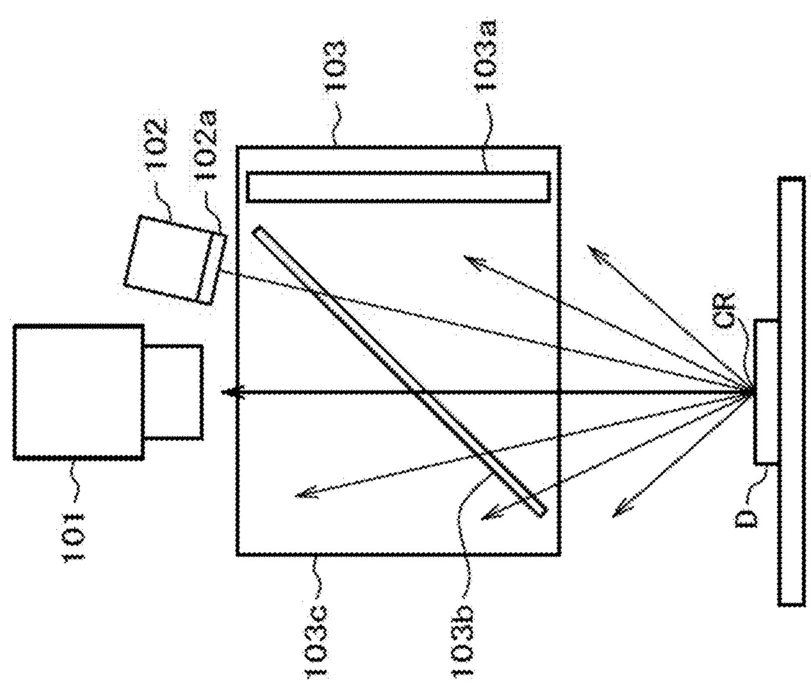
Figure 5:
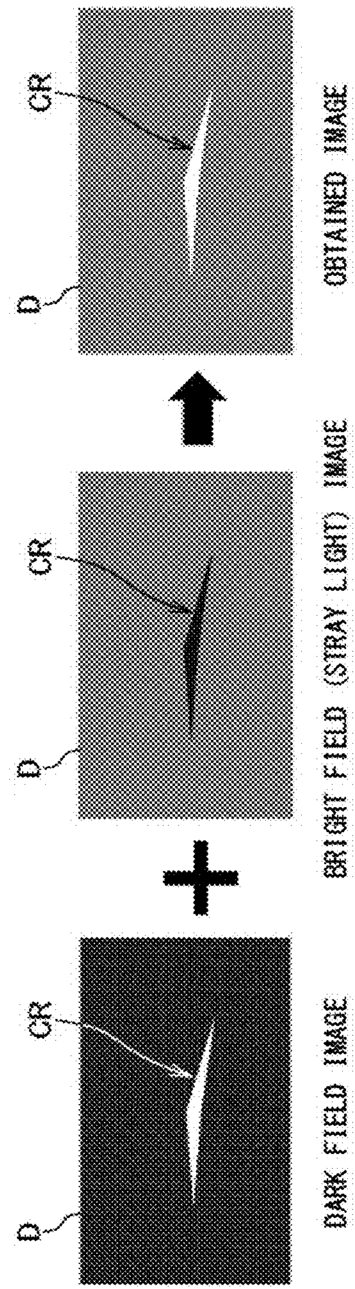
FIG. 5 is a diagram showing a composite image of a dark field image and a bright field image.

Problems that can occur if the oblique illumination is disposed above the coaxial illumination will be explained with reference to FIG. 2 to FIG. 5. FIG. 2 is a diagram showing the light paths of the oblique illumination in the case where the oblique illumination is disposed above the coaxial illumination. FIG. 3A and FIG. 3B are diagrams each of which shows a light path that passes through a half mirror among the light paths of the oblique illumination shown in FIG. 2, FIG. 3A is a diagram showing a case of a region with a crack being irradiated, and FIG. 33 is a diagram showing a case of a region without a crack being irradiated. Each of FIG. 4A and FIG. 4B is a diagram showing a light path that irradiates the light emitting section of the coaxial illumination among the light paths of the oblique illumination shown in FIG. 2, FIG. 4A is a diagram showing a case of the region with a crack being irradiated, and FIG. 4B is a diagram showing a case of the region without a crack being irradiated. FIG. 5 is a diagram showing a composite image of a dark field image and a bright field image.

Figure 15:
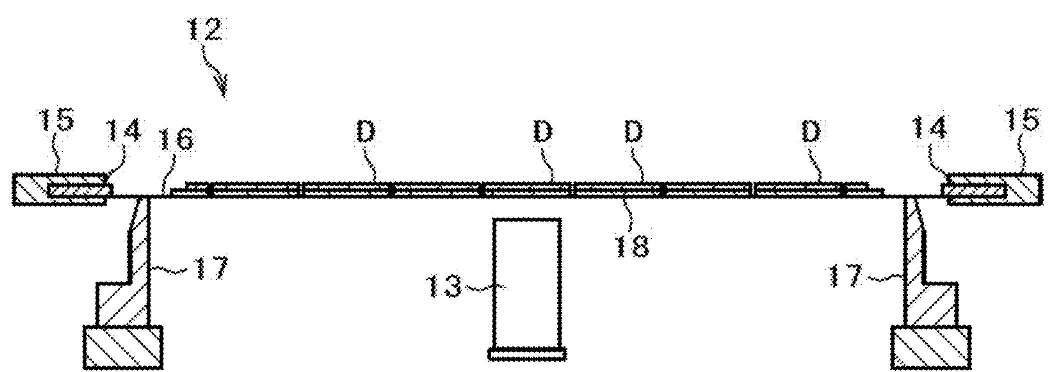
FIG. 15 is a schematic cross-sectional view showing the main part of a die feed section shown in FIG. 13.

An illumination device shown in FIG. 2 has the same configuration as the configuration of the illumination device shown in FIG. 1B except that the oblique illumination 102 is disposed above the coaxial illumination 103 instead of below the coaxial illumination shown in FIG. 15. Here, the oblique illumination 102 is disposed in the vicinity of the camera 101 as is the case with FIG. 1A.

Here, even if a bullet-shaped LED is adopted as a parallel light source in the oblique illumination 102, light may leak to the outside of the irradiation angle in some cases. Furthermore, it is necessary that the unevenness of brightness of the light source of the oblique illumination 102 for crack inspection should be suppressed, so that, for example, a diffusion plate may be used in order to suppress the unevenness of the brightness of LED illumination used for the light source.

In addition, the light emitting surface of the light emitting section 103*a* of the coaxial illumination 103 sometimes reflects or diffuses light from the outside, and irradiates the half mirror 103*b* with the light. In the coaxial illumination, diffused light is effective not only for preventing the unevenness of brightness but also for clearly photographing a target (die), so that a diffusion plate is sometimes installed in front of the plane light emitting source. The diffusion plate itself does not emits light but can be regarded as a pseudo-light emitting surface. A reflection plate having a diffuse reflection surface can also be used for the structure of the diffusion plate in addition to a transparent plate of acrylic material or the like. Although the diffusion plate tends to cause pseudo-light-emitting due to light from an external light source, not only the diffusion plate but also a colored filter used for cutting specific wavelengths or the like sometimes causes a phenomenon similar to the phenomenon caused by the diffusion plate.

As shown in FIG. 2, if the oblique illumination 102 is disposed above the coaxial illumination 103, and only the oblique illumination 102 is turned on, plural light paths from the light emitting section 102*a* of the oblique illumination 102 spread as shown by arrows in FIG. 2 due to leakage light, the diffusion plate, and the like. The irradiation light from the light emitting section 102*a* includes light that passes through the half mirror 103*b* and that is irradiated to the die D, light that reaches the inside of the mirror cylinder 103*c*, and light that reaches the light emitting section 103*a*. Here, light that does not travel in the originally intended direction is called stray light in this specification, so light that reaches the light emitting section 103*a* is stray-light. Now, the mirror cylinder 103*c* is a cylinder-shaped molded product, and has a structure that prevents light from places other than predefined places from entering the mirror cylinder 103*c* itself and from being reflected by the inside surface of the mirror cylinder 103*c*. Therefore, light that reaches the inside of the mirror cylinder 103*c* is not reflected except that minute diffuse reflections occur.

If, among light that passes through the light channels shown by the arrows in FIG. 2, light, which passes through the half mirror 103*b* from the oblique illumination 102 and passes through a light channel leading to the die D, is irradiated to a crack CR obliquely with respect to the light axis as shown in FIG. 3A, reflected light, which is reflected along the light axis among light scattered at the crack CR, enters the camera 101, so that the crack region is illuminated. On the other hand, as shown in FIG. 3B, if light is irradiated to a region without a crack obliquely with respect to the light axis, reflected light, which is reflected symmetrically with respect to the light axis, does not enter the camera 101, which leads to a dark field irradiation due to which a normal region is darkly photographed.

Among the light that passes through the light channels shown by the arrows in FIG. 2, light (stray light), which is emitted from the oblique illumination 102 and is irradiated to the light emitting section 103*a* inside the coaxial illumination 103, is scattered at the light emitting section 103*a* as shown in FIG. 4A and FIG. 4B. Among this scattered light, light that is reflected at a right angle to the light axis (reflected horizontally) is reflected by the half mirror 103*b*, and is irradiated to the die D along the light axis. As shown in FIG. 4A, light irradiated to the crack CR is scattered and loses reflected light along the light axis, so that the light reflected by the crack CR does not enter the camera 101, which darkens the crack CR. On the other hand, as shown in FIG. 4B, light irradiated to a region without a crack is reflected along the light axis. The reflected light enters the camera 101, which leads to a bright field irradiation due to which a normal region is brightly photographed.

As shown in FIG. 5, in the dark field caused by the irradiation by the oblique illumination, there is a large brightness difference between the brightness of the crack CR and the brightness of the surface of the die B. On the other hand, in the bright field caused by the coaxial illumination the light source of which is the stray light explained using FIG. 4A and FIG. 4B, since the stray light undergoes the processes of the diffusion and reflection, a difference between the brightness of the crack CR and the brightness of the surface of the die D in the bright field becomes smaller than that in the dark field accordingly. When composition is executed using irradiation that causes a dark field image shown in FIG. 5 and irradiation that causes a bright field image shown in FIG. 5, an image in which the brightness difference between the brightness of the crack CR (crack region) and the brightness of the surface of the die D (normal region) is decreased is obtained as shown in FIG. 5. As a result, it becomes difficult to detect a small crack having a small brightness difference or to accurately measure the length of a crack.

Therefore, in the present embodiment, a light path control member for limiting the light path of the irradiation light of the oblique illumination is installed in an illumination device so that irradiation light from the light emitting section of the oblique illumination is prevented from being irradiated to the light emitting surface of the light emitting section of the coaxial illumination in order to reduce stray light.

Figure 6:
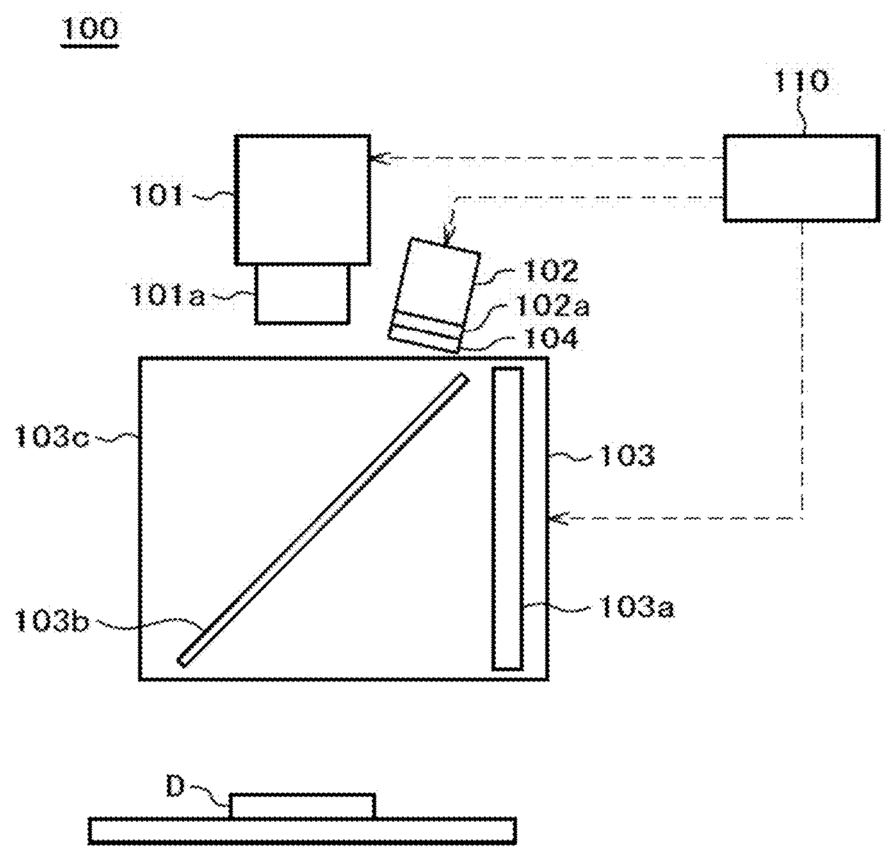
FIG. 6 is a diagram showing the disposition of a camera of a die bonding apparatus and an illumination device for irradiating a photographing target die with image photographing light in an embodiment.

The configuration of a die bonding apparatus according to this embodiment will be explained with reference to FIG. 6. FIG. 6 is a diagram showing the disposition of a camera of a die bonding apparatus and an illumination device for irradiating a photographing target die with image photographing light in this embodiment.

The die bonding apparatus 100 according to this embodiment includes a camera 101, a coaxial illumination 103 as a first illumination device, an oblique illumination 102 as a second illumination device, and a control device 110.

The camera 101 includes an object lens 101*a* on its tip, and the camera 101 is configured to be used for photographing an image of the main surface of the die D through this objective lens 101*a*. The oblique illumination 102, which is a ring illumination, a bar illumination, or the like, is fixed in the vicinity of the objective lens 101*a*, and the oblique illumination 102 is an illustration apparatus for crack inspection.

The coaxial illumination 103, which is composed of a light emitting section 103*a* as a first light emitting section having a plane light emitting source and a mirror cylinder 103*c* including a half mirror (semi-transmissive mirror) 103*b* inside, is disposed between the camera 101 and the die D. Here, the plane light emitting source is a light emitting source that homogeneously irradiates light from its plane-type light emitting surface, and has a structure that has a thin and flat light source with surface-mounted chip LEDs or a diffusion plate making its irradiation light homogeneous. The irradiation light as first irradiation light emitted from the light emitting section 103*a* is reflected along the same light axis as the light axis of the camera 101 by the half mirror 103*b*, and is irradiated to the die D. The scattered light irradiated to the die D along the same light axis as the light axis of the camera 101 is reflected by the die D, and positive reflected light among the light reflected by the die D passes through the half mirror 103*b*, reaches the camera 101, and forms the image of the die D. Therefore, if the die D is photographed by the camera 101 using the coaxial illumination 103, the surface of the die D becomes a bright field for a crack.

Furthermore, in the light emitting section 103*a*, the diffusion plate can be installed on a surface of the plane light emitting source nearer to the half mirror 103*b*. The diffusion plate is a plate-shaped component that diffuses light emitted from a light source and reduces the unevenness of illumination, and whose color is milky-white or the like. In this case, the irradiation light from the plane light emitting source becomes scattered light after passing through the diffusion plate, and the scattered light is reflected by the half mirror 103*b* along the same light axis as that of the camera 101, and is irradiated to the die D.

As described above, in this embodiment, irradiation light emitted from a plane light emitting illumination that inherently comes to have a large irradiation area is irradiated to the main surface of the die D. Therefore, it becomes possible to irradiate irradiation light emitted from the plane light emitting source to an area larger than the main surface of the die D. As a result, the positive reflected light, which is reflected by the die D and travels inside the mirror cylinder 103*c*, enters the camera 101 with its large area, which can prevent the image of the die D from being partially blurred, so that it becomes possible to easily judge whether or not the pickup target die D is accurately disposed in a pickup position.

The oblique illumination 102 is fixed so that the light of the oblique illumination 102 is irradiated to the surface of the die D at a predefined angle in respect to the light axis of the camera 101. When the die D is photographed by the camera 101 using the oblique illumination 102, the surface of the die D becomes a dark field for the crack, and the reflectivity of the surface of the die D is different from that of the crack, so that a contrast (brightness difference) can be more easily obtained. The closer the incident angle of this oblique illumination 102 is to being vertical, the larger the contrast between the crack and the background becomes, so that it becomes easy to execute classifying (binarization or the like) on an image, which leads to the improvement of the detection sensitivity of the oblique illumination 102.

In order to make the incident angle of the oblique illumination 102 close to being vertical, the oblique illumination 102 is installed above the coaxial illumination 103 and near to the camera 101, and the irradiation light emitted from the oblique illumination 102 as second irradiation light passes through inside the mirror cylinder 103*c*, and is irradiated to the die D. Note that a light path control member 104 is fixed to the light emitting surface of a light emitting section 102*a* which behaves as a second light emitting section of the oblique illumination 102.

The advantageous effects of the illumination device according to this embodiment will be explained with reference to FIG. 7A and FIG. 75. FIG. 7A is a diagram showing the light paths in the illumination device shown in FIG. 2, and FIG. 7B is a diagram showing the light paths in the illumination device shown in FIG. 6.

Figure 7B:
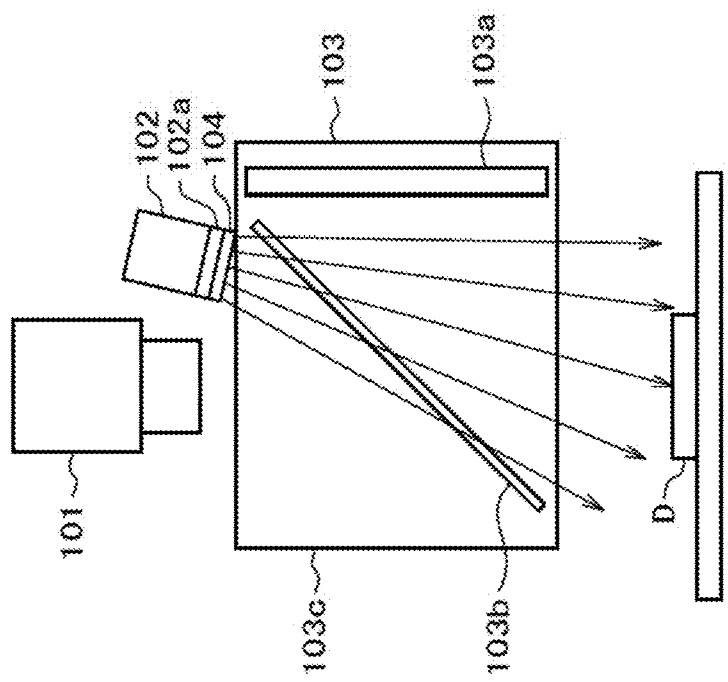
FIG. 7B is a diagram showing the light paths of the illumination device shown in FIG. 6.
Figure 7A:
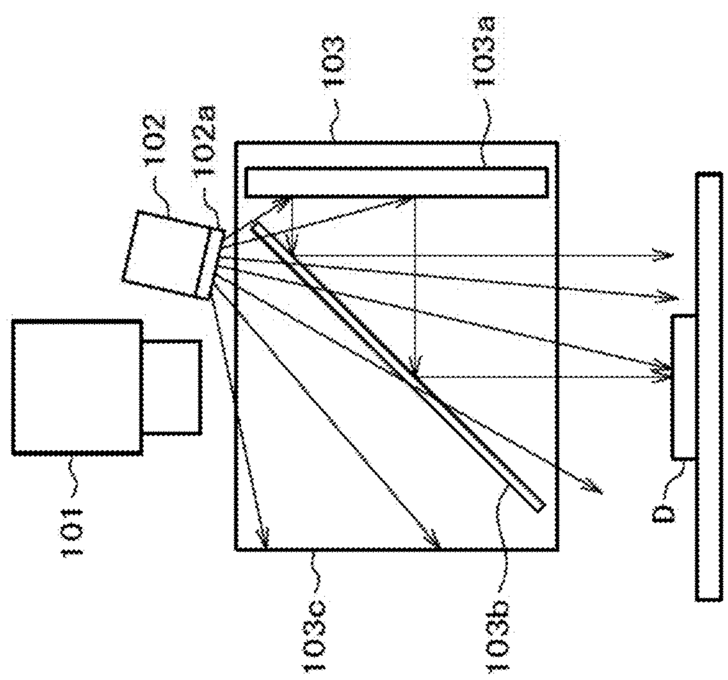
FIG. 7A is a diagram showing the light paths of the illumination device shown in FIG. 2.

Installing the light path control member 104 makes it possible to prevent the diffused rays traveling in all the directions as shown in FIG. 7A from occurring, and as shown in FIG. 7B, almost all the rays irradiated from the oblique illumination 102 pass through the half mirror 103*b*, and are directly irradiated to the die D.

Herewith, if the oblique illumination is installed above the coaxial illumination and only the oblique illumination is turned on, the stray light with which the oblique illumination irradiates the light emitting surface inside the coaxial illumination is prevented from occurring. As a result, the occurrence of coaxial illumination with the stray light as its light source is suppressed and, by making a background to be darkly photographed darker, a contrast between the background and a crack is highlighted, which makes it easy to detect the crack. In addition, minute diffusely reflected light can be prevented from occurring on the side surface of the mirror cylinder or the like.

Figure 8A:
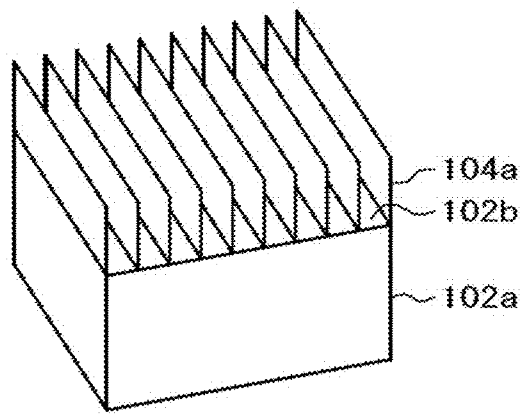
FIG. 8A is a perspective view showing a louver fixed to the light emitting section of the oblique illumination.
Figure 8B:
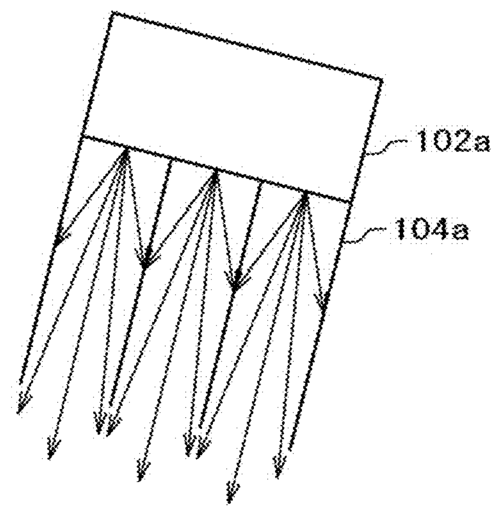
FIG. 8B is a front view showing light paths in a condition that the oblique illumination shown in FIG. 3A is installed.
Figure 8C:
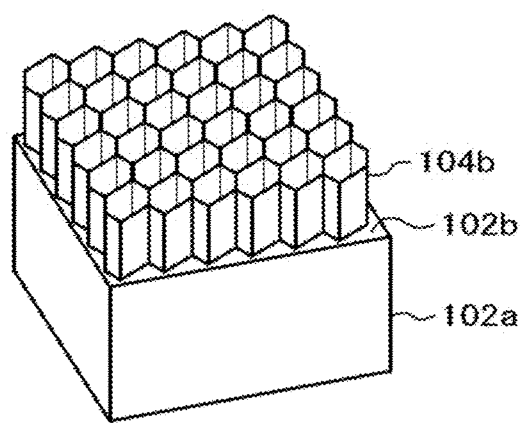
FIG. 8C is a perspective view showing a honeycomb louver fixed to the light emitting section of the oblique illumination.
Figure 8D:
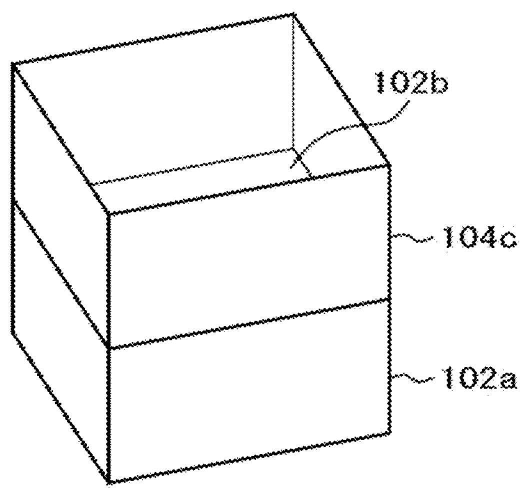
FIG. 8D is a perspective view showing a hood fixed to the light emitting section of the oblique illumination.

A concrete example of the light path control member 104 will be explained with reference to FIG. 8A to FIG. 8D. FIG. 8A is a perspective view of a louver fixed to the light emitting section of the oblique illumination. FIG. 3B is a front view showing light paths in a condition that the oblique illumination shown in FIG. 8A is installed. FIG. 8C is a perspective view showing a honeycomb louver fixed to the light emitting section of the oblique illumination. FIG. 8D is a perspective view showing a hood fixed to the light emitting section of the oblique illumination. Here, the light path control member 104 can be fixed to the light emitting section 103*a* of the coaxial illumination 103 other than the light emitting section 102*a* of the oblique illumination 102, and additionally, two light path control members 104 can be fixed to both light emitting section 102*a* and light emitting section 103*a* respectively.

(a) Viewing Angle Control Film (Filter)

A viewing angle control film is also called a privacy film, an anti-peep film, or a light path control film, and is used for the display of a personal computer or the like. For example, the viewing angle control film is fixed to the light emitting surface of the light emitting section 102*a* of the oblique illumination 102 by pasting or the like. This member does not occupy much space and can block stray light coming from any direction.

(b) Light Shielding Louver

As shown in FIG. 8A, a louver 104*a* is formed of plural plate-shaped members each of which is fixed, for example, perpendicularly to the light emitting surface 102*b* of the light emitting section 102*a* and that are in parallel to one another at predefined intervals. As shown in FIG. 8B, the irradiation angles of diffused rays are restricted. It becomes possible to strengthen environmental resistance of a louver by using a metallic light shielding louver. A light shielding louver is not limited to a louver formed of plural plate-shaped members that are arranged in parallel to one another as shown in FIG. 8A, but can be a louver formed of plural members the cross-section of each of which is a polygonal ring, a circular ring, or the like. For example, a honeycomb louver 104*b* that is formed of plural hexagonal column-shaped members as shown in FIG. 8C (the entirety of the louver shows a honeycomb pattern) can be used. Furthermore, regions among the respective members of a louver can be filled up with material through which light can pass.

(c) Fiber Optic Plate

A fiber optic plate is an optical device composed of bundled minute (several μm) optical fibers, and can directly introduce light or an image that enters the fiber optic plate itself to an output surface. The fiber optic plate is fixed to the light emitting surface of the light emitting section 102*a* of the oblique illumination 102. Herewith, the stray light caused by omnidirectional diffused light or the like can be prevented from occurring without using much space.

(d) Optical Lens

An optical lens is an optical element that diverges or converges light by refracting the light. The optical lens, which collects light by refraction and narrows down the direction of the light, is fixed to the light emitting surface of the light emitting section 102*a* of the oblique illumination 102. Herewith, the light from the oblique illumination is aggregated, so that the stray light is prevented from occurring. In addition, the brightness of the oblique illumination can be raised.

(e) Fresnel Lens

A Fresnel lens is obtained by replacing a curved surface of the optical lens described in the above (d) with a series of concentric grooves. These grooves work as refractive surfaces respectively, and bend the light paths of parallel rays to focus the rays at a predefined focal point. Herewith, although being physically thin-shaped, the Fresnel lens can focus rays at a point as is the case with the optical lens. The Fresnel lens, which collects light by refraction and narrows down the direction of the light, is fixed to the light emitting surface of the light emitting section 102*a* of the oblique illumination 102. Herewith, the light from the oblique illumination 102 is aggregated, so that the stray light is prevented from occurring. In addition, the brightness of the oblique illumination 102 can be raised. Furthermore, a linear Fresnel lens, which has parallel linear grooves and in which light is aggregated on a straight line, can be used.

(f) Illumination Hood

As shown in FIG. 8D, a hood having a shielding structure for blocking light diffusion is fixed to the light emitting surface 102*b* of the light emitting section 102*a*. Herewith, it becomes possible to reduce irradiation to the light emitting surface inside the coaxial illumination 103 without decreasing the brightness of the oblique illumination.

Figure 9:
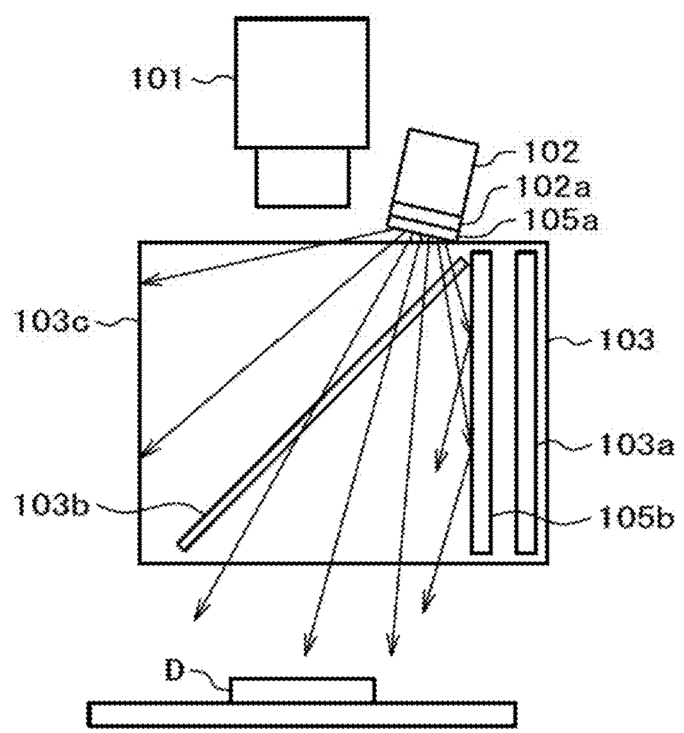
FIG. 9 is a diagram showing light paths in the case where polarizing filters are fixed to both oblique illumination and coaxial illumination respectively in the embodiment shown in FIG. 6.

The light path control member fixed to both oblique illumination 102 and coaxial illumination 103 will be explained with reference to FIG. 9. FIG. 9 is a diagram showing light paths in the case where polarizing filters are fixed to both oblique illumination and coaxial illumination respectively in this embodiment shewn in FIG. 6.

(g) Polarizing Filter

A polarizing filter 105*a* is fixed to the light emitting surface of the light emitting section 102*a* of the oblique illumination 102 as a first light path control member, and at the same time, a polarizing filter 105*b* is fixed to the light emitting surface of the light emitting section 103*a* of the coaxial illumination 103 as a second light path control member. Each of the polarizing filter 105*a* and the polarizing filter 105*b* is a polarization filter for linear polarization, circular polarization, or elliptical polarization, and the polarizing direction of the polarizing filter 105*a* and the polarizing direction of the polarizing filter 105*b* are made to be orthogonal to each other. Herewith, the occurrence of coaxial illumination light with stray light as its light source can be prevented without narrowing the irradiation area of the oblique illumination 102.

It is also conceivable that, without fixing the light path control member 104 to the light emitting section 102*a*, the light path of the irradiation light of the oblique illumination 102 is controlled by shielding the scattered light of the oblique illumination 102 with the use of a structure of the coaxial illumination 103 and the like.

(h) Light Shielding Louver

The light shielding louver described in the above (b) or the hood described in the above (f) is fixed to the light emitting surface of the light emitting section 103*a* of the coaxial illumination 103 lest the light of the oblique illumination 102 should be irradiated to the light emitting surface of the light emitting section 103*a* of the coaxial illumination 103. Herewith, the stray light from the oblique illumination 102 can be prevented from entering the light emitting surface of the light emitting section 103*a* of the coaxial illumination 103 without decreasing the brightness of the oblique illumination 102.

(i) Window Frame Structure

Figure 10A:
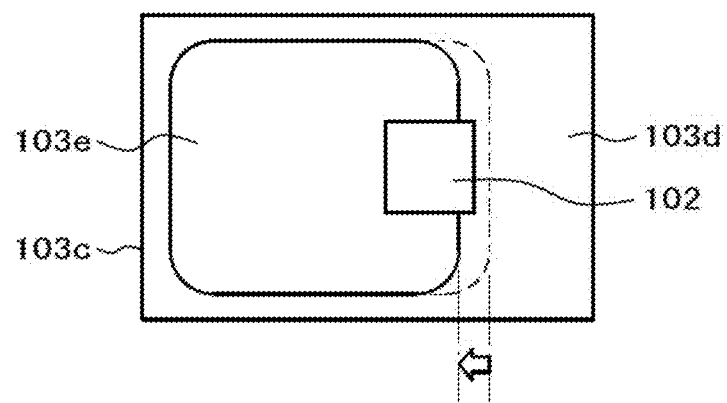
FIG. 10A is a top view showing the change of the window frame structure of the coaxial illumination in the embodiment shown in FIG. 6.
Figure 10B:
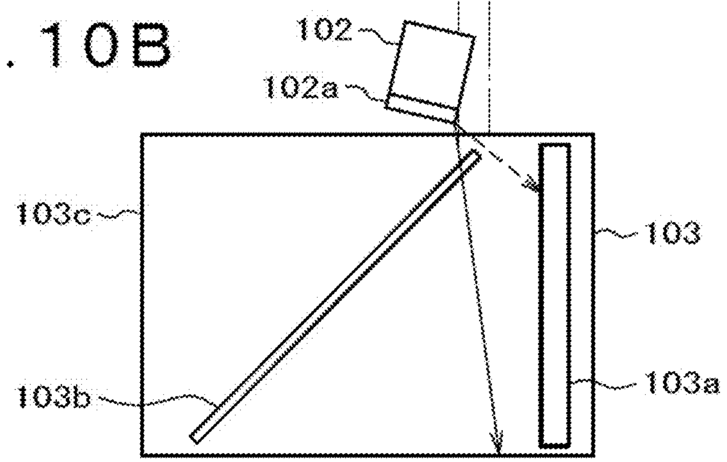
FIG. 10B is a cross-sectional view of FIG. 10A.

The change of the structure of the coaxial illumination 103 in this embodiment shown in FIG. 6 will be explained with reference to FIG. 10A and FIG. 10B. FIG. 10A is a top view showing the change of the window frame structure of the coaxial illumination 103 in this embodiment shown in FIG. 6, and FIG. 10B is a cross-sectional view of FIG. 10A.

As shown in FIG. 10A, by adjusting the size of a window 103*e* (or the frame of the window 103*e*) formed in a ceiling 103*d* of the top surface of the coaxial illumination 103, light diffusion is shielded by the ceiling 103*d*. Here, the window 103*e* allows the irradiation light of the oblique illumination 102 and light that is about to enter the camera 101 to pass through the window 103*e* itself. Herewith, as shown in FIG. 10B, a light path shown by a dashed arrow vanishes, so that it becomes possible that the light of the oblique illumination 102 is made not to be irradiated to the light emitting surface of the light emitting section 103*a* of the coaxial illumination 103. The ceiling 103*d* function as a light path control member that limits the light path of the irradiation light from the light emitting section 102*a*. Therefore, the number of components is reduced, so that the cost can be reduced.

(j) Adjustment (Retraction) of Position of Light Emitting Section

Figure 11:
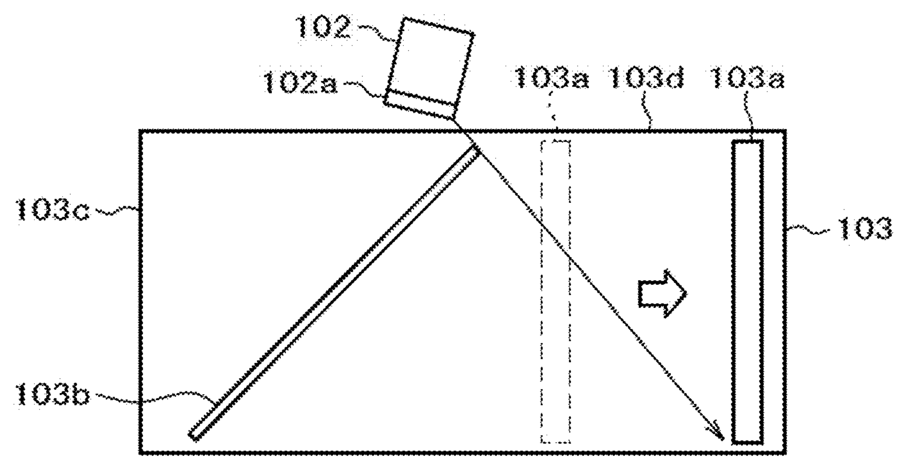
FIG. 11 is a cross-sectional view showing the change of the light emitting section of the coaxial illumination in the embodiment shown in FIG. 6.

The change of the structure of the coaxial illumination 103 in this embodiment shown in FIG. 6 will be explained with reference to FIG. 11. FIG. 11 is a cross-sectional view showing the change of the light emitting section of the coaxial illumination 103 in this embodiment shown in FIG. 6.

As shown in FIG. 11, the light emitting section 103*a* of the coaxial illumination 103 is disposed farther from the half mirror 103*b*. As a result, since the ceiling 103*d* shields light diffusion, it becomes possible to prevent the light of the oblique illumination 102 from being irradiated to the light emitting surface of the light emitting section 103*a* of the coaxial illumination 103 as shown in FIG. 11. The ceiling 103*d* functions as a light path control member that limits the light path of the irradiation light emitted from the light emitting section 102*a*. Therefore, the number of components can be reduced, and the cost can be reduced.

(k) Configuration of Light Emitting Surface

A liquid crystal is used for the light emitting surface of the coaxial illumination 103 so that a difference between the brightness of reflected light at the time of the coaxial illumination 103 being in an off-state and the brightness of emitted light at the time of the coaxial illumination 103 being in an on-state is extremely large. Herewith, the occurrence of coaxial illumination light with the stray light as its light source can be prevented without narrowing the irradiation area of the oblique illumination 102.

(l) Coaxial Illumination in Lens Mirror Cylinder

Figure 12:
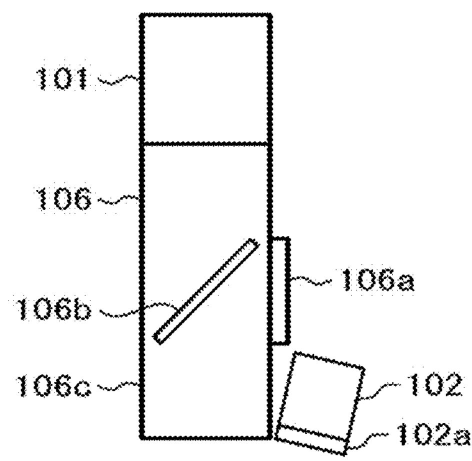
FIG. 12 is a diagram showing the disposition of an illumination device in the case where the coaxial illumination in the embodiment shown in FIG. 6 is changed into the coaxial illumination in a lens mirror cylinder.

An example in the case where the coaxial illumination in this embodiment shown in FIG. 6 is changed into the coaxial illumination in a lens mirror cylinder will be explained with reference to FIG. 12. FIG. 12 is a diagram showing the disposition of an illumination device in the case where the coaxial illumination in the lens mirror cylinder is used. A coaxial illumination lens 106, which includes a light source section 106*a* composed of a surface light emitting source, a half mirror 106*b*, and a telecentric lens in the lens mirror cylinder 106*c*, is installed below the camera 101. Irradiation light emitted from the light source section 106*a* is reflected along the same light axis as the light axis of the camera 101 by the half mirror 106*b*, and is irradiated to the die D. The scattered light irradiated to the die D along the same light axis as the light axis of the camera 101 is reflected by the die D, and positive reflected light among the light reflected by the die passes through the half mirror 106*b*, reaches the camera 101, and forms the image of the die D.

The irradiation range of the coaxial illumination of the coaxial illumination lens 106 is narrower than the irradiation range of the coaxial illumination 103. Generally speaking, the narrower the irradiation range of the coaxial illumination is, the weaker the coaxial illumination is for a warp of a die. However, endurance against a warp is not so much influenced by an irradiation angle viewed from a light source, and is dependent on the viewing angle (the magnitude of the viewing angle) of the light emitting surface of the light source viewed from the relevant photographic subject. The chief rays of the telecentric lens are generally parallel to the light axis in an image and/or photographic subject space.

Perfect parallel rays viewed from a photographic subject are rays emitted from a point light source, and a point-like light source can be seen inside the lens. On the other hand, by installing a surface light emitting source that is larger than the point light source as a light source in the telecentric lens, it becomes possible that parallel rays having large viewing angles (having a large light emitting surface) viewed from the photographic subject can be received. Therefore, the coaxial illumination lens 106 can have endurance against a warp that is equivalent to that of the coaxial illumination 103.

The oblique illumination 102 is installed in the vicinity of the coaxial illumination lens 106 so that the oblique illumination 102 does not shield the irradiation light of the coaxial illumination. Herewith, since it is unnecessary to dispose the oblique illumination above the coaxial illumination and the irradiation light of the oblique illumination does not pass through the inside of the mirror cylinder of the coaxial illumination, stray light irradiated to the light emitting surface of the coaxial illumination can be removed completely.

Here, if one or more bar illuminations are used as the oblique illumination 102, a pair of bar illuminations, one of which irradiates light in one direction and the other of which irradiates light in the other direction, can be used, or four bar illuminations, which irradiate light in four directions, can be used.

Example

Figure 13:
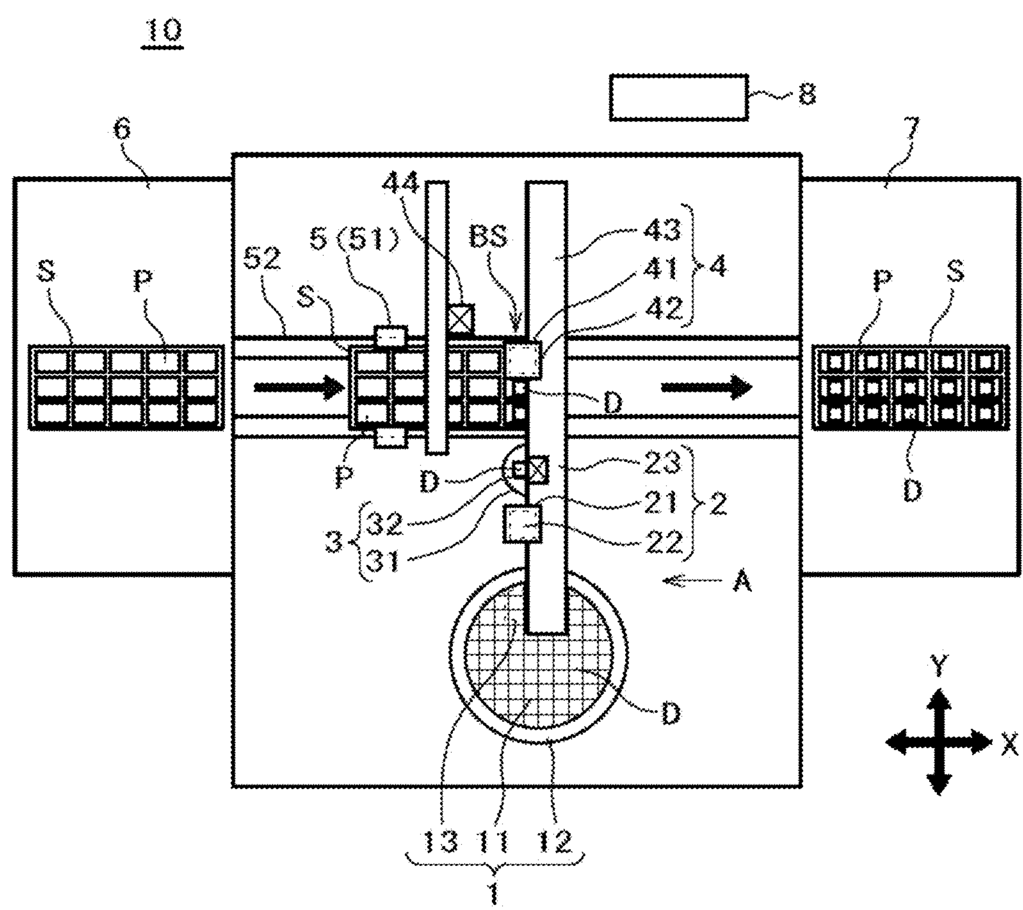
FIG. 13 is a schematic top view showing a configuration example of a die bonder of an example.
Figure 14:
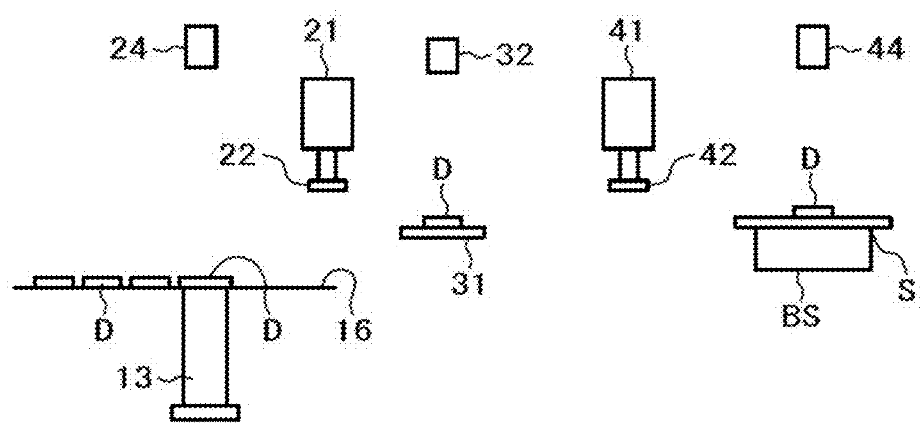
FIG. 14 is a diagram used for explaining the schematic configuration of the die bonder as viewed from an arrow A in FIG. 13.

FIG. 13 is a schematic top view showing the configuration of a die bonder of the present example. FIG. 14 is a diagram used for explaining the schematic configuration of the die bonder as viewed from an arrow A in FIG. 13.

Schematically describing, the die bonder 10 includes a die feed section 1 that feeds dice D to be mounted on a substrate S on which one or more product areas (hereinafter, referred to as package areas P), each of which finally becomes a package, are printed, a pickup section 2, an intermediate stage section 3, a bonding section 4, a transfer section 5, a substrate feed section 6, a substrate carrying-out section 7, and a control section 8 that monitors and controls the behaviors of the respective sections. The Y axis direction is a direction along which the die bonder 10 moves back and forth, and the X axis direction is a direction along which the die bonder 10 moves left and right. The die feed section 1 is disposed on the front portion of the die bonder 10 and the bending section 4 is disposed on the rear portion.

First, the die feed section 1 feeds a die D to be mounted on a package area P of the substrate S. The die feed section 1 includes a wafer holder 12 for holding a wafer 11, and a push-up unit 13 that pushes up a die D from the wafer 11 and is shown in dashed lines. The die feed section 1 is moved in the X or Y directions by unshown drive means, and moves a die D to be picked up to the position of the push-up unit 13.

The pickup section 2 includes a pickup head 21 for picking up a die D, a Y drive section 23 for moving the pickup head 21 in the Y direction, unshown drive sections for moving a collet 22 up and down, rotating the collet 22, and moving the collet 22 in the X direction respectively. The pickup head 21 includes the collet 22 (also see FIG. 14) for sucking and holding a pushed-up die D at its tip, and picks up the die D from the die feed section 1 to place the die D on an intermediate stage 31. The pickup head 21 includes unshown drive sections for moving the collet 22 up and down, rotating the collet 22, and moving the collet 22 in the X direction respectively.

The intermediate stage section 3 includes the intermediate stage 31 for temporally place a die D, and a stage recognition camera 32 for recognizing the die D on the intermediate stage 31.

The bonding section 4 picks up the die D from the intermediate stage 31, and bonds the die D on a package area P of a transferred substrate S or bonds the die D on a die already-bonded on the package area P of the substrate S in such a manner that these dice are laminated. The bonding section 4 includes a bonding head 41 having a collet 42 (also see FIG. 14) for sucking and holding a die D at its tip as is the case with the pickup head 21, a Y drive section 43 for moving the bonding head 41 in the Y direction, a substrate recognition camera 44 for photographing the position recognition mark (not shown) of a package area P of a substrate S to recognize a bonding position in the package area P, and an XY drive section 45 for driving the substrate recognition camera 44 in the X axis direction or the Y axis direction. With such a configuration, the bonding head 41 corrects the pickup position/posture of the die D on the basis of the photographed data of the stage recognition camera 32, picks up a die D from the intermediate stage 31, and bonds the die D on a substrate S on the basis of the photographed data of the substrate recognition camera 44.

The transfer section 5 includes substrate transfer claws 51 used for clawing and transferring a substrate S, and a transfer lane 52 along which the substrate S is transferred. The substrate S is transferred by driving unshown nuts of the substrate transfer claws 51 fixed to the transfer lane 52 with unshown ball screws fixed along the transfer lane 52. With the use of such a configuration, the substrate S is moved from the substrate feed section 6 to the bonding position along the transfer lane 52, and after the die D is bonded, the substrate S is moved to the substrate carrying-out section 7, and is passed to the substrate carrying-out section 7.

The control section 8 includes memories for storing programs (software) for monitoring and controlling the behaviors of the respective sections of the die bonder 10, and a central processing unit (CPU) for executing the programs stored in the memories.

Next, the configuration of the die feed section 1 will be explained with reference to FIG. 15. FIG. 15 is a schematic cross-sectional view showing the main part of the die feed section shown in FIG. 13.

The die feed section 1 includes the wafer holder 12 that moves in the horizontal direction (XY direction), and the push-up unit 13 that moves up and down. The wafer holder 12 includes an expand ring 15 that holds a wafer ring 14, and a support ring 17 that horizontally positions a dicing tape 16 that is held by the wafer ring 14 and to which plural dice D are bonded. The push-up unit 13 is disposed inside the support ring 17.

When the die feed section 1 pushes up a die D, the die feed section 1 brings down the expand ring 15 that supports the wafer ring 14. As a result, the dicing tape 16 supported by the wafer ring 14 is stretched, spaces among dice D are expanded, and the die D is pushed up from under the die D itself by the push-up unit 13, which improves die D picked-up performance. Now, with the thinning of components, a bonding agent for bonding a die to a substrate has changed from a liquid agent to a film agent, and a film-shaped bonding material called a die attach film (DAF) 18 is attached to the wafer 11 and the dicing tape 16 in such a way that the film material is sandwiched in between the wafer 11 and the dicing tape 16. If a wafer 11 includes the die attach film 18, dicing is performed on both wafer 11 and die attach films 18. Therefore, in the peeling step, the wafer 11 and the die attach film 18 are peeled off from the dicing tape 16.

The die bonder 10 includes a wafer recognition camera 24 for recognizing the posture and position of a die D on the wafer 11, the stage recognition camera 32 for recognizing the posture and position of a die D on the intermediate stage 31, and the substrate recognition camera 44 for recognizing the mounting position of a bonding stage BS. As for the postures of the above recognition cameras, what must be corrected is misalignment between the posture of the stage recognition camera 32 involved in the pickup performed by the bonding head 41 and the posture of the substrate recognition camera 44 involved in the bonding on the mounting position performed by the bonding head 41. In this example, not only the wafer recognition camera 24, the stage recognition camera 32, and the substrate recognition camera 44, but also the coaxial illumination 103 and the oblique illumination 102, which have been described in the embodiment, are used for positioning a die D and the surface inspection of a die D.

Figure 16:
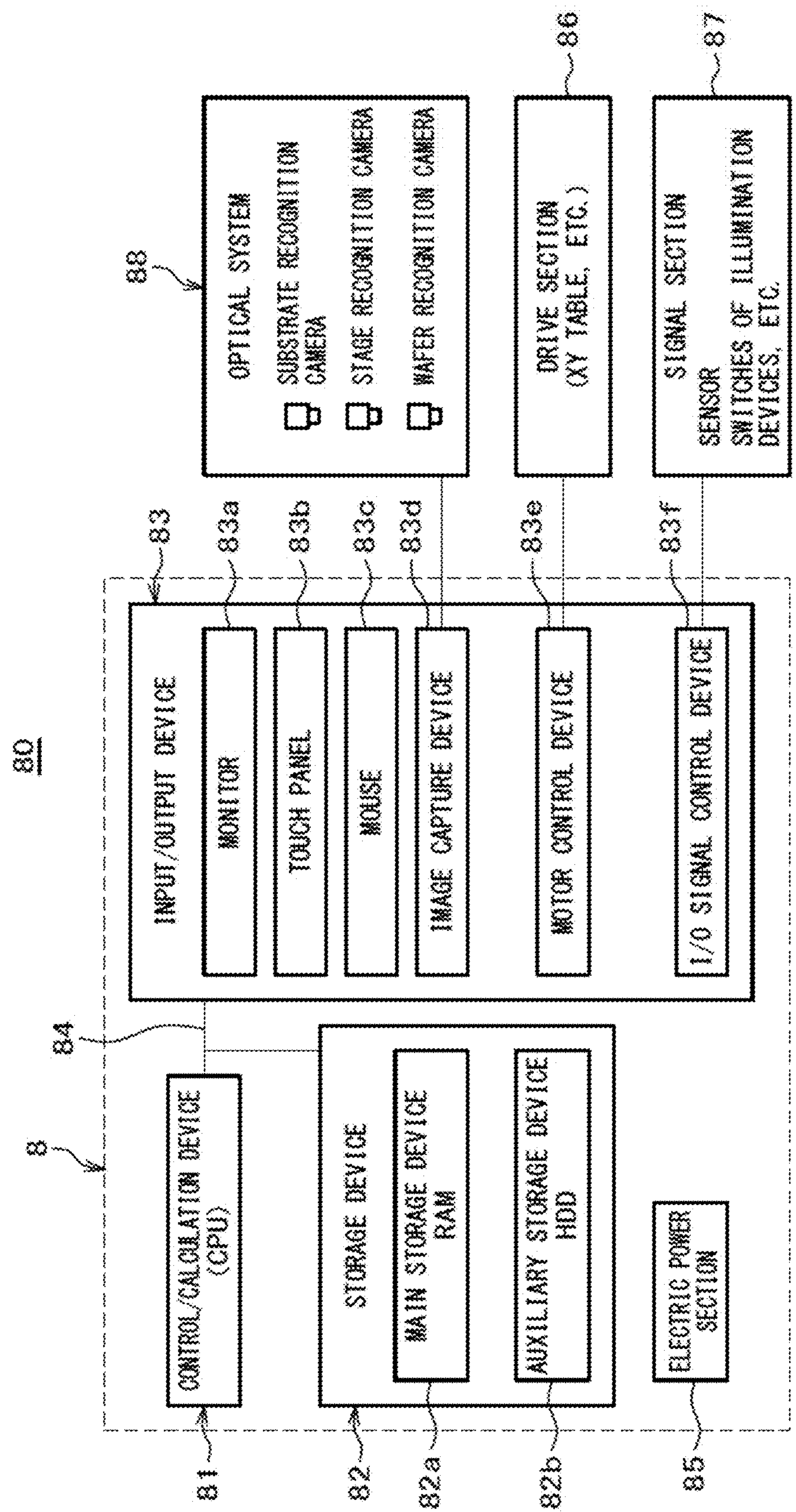
FIG. 16 is a block diagram showing the schematic configuration of the control system of the die bonder shown in FIG. 13.

Next, the control section 8 will be explained with reference to FIG. 16. FIG. 16 is a block diagram showing the schematic configuration of a control system of the die bonder shown in FIG. 13.

The control system 80 includes the control section 8, a drive section 86, a signal section 87, and an optical system 88. Schematically speaking, the control section 8 includes a control/calculation device 81 mainly composed of a CPU, a storage device 32, an input/output device 83, a bus line 84, and an electric power section 85. The storage device 82 includes a main storage device 82*a* composed of RAMs that store processing programs and the like, and an auxiliary storage device 82*b* composed of an HDD and an SSD that store control data necessary for control, image data, and the like. The input/output device 83 includes a monitor 83*a* for displaying the states of devices, information, and the like, a touch panel 83*b* into which an operator inputs his/her instructions, a mouse 83*c* used for operating the monitor, and an image capture device 83*d* for capturing image data from the optical system 88. Furthermore, the input/output device 83 further includes a motor control device 83*e* for controlling a drive section 86 including the XY table (not shown) of the die feed section 1, the ZY drive axes of a bonding head table, the XY drive axis of the substrate recognition camera, and the like, and an I/O signal control device 83*f* for capturing or controlling various sensor signals and signals transmitted from a signal section 87 including the switches and the like of the illumination devices and the like. The optical system 88 includes the wafer recognition camera 24, the stage recognition camera 32, and the substrate recognition camera 44. The control/calculation device 81 captures necessary data via the bus line 84, calculates the data, and controls the pickup head 21 and the like or transmits information to the monitor 83*a* or the like.

The control section 8 stores image data photographed by the wafer recognition camera 24, the stage recognition camera 32, and the substrate recognition camera 44 in the storage device 82 via the image capture device 83*d*. The positioning of a die D and the package area P of a substrate S and the surface inspection of the die D and the substrate S are performed on the basis of the stored image data by programmed software using the control/calculation device 81. The drive section 86 is operated by software via the motor control device 83*e* on the basis of the positions of the die D and the package area P of the substrate S calculated by the control/calculation device 81. Through this process, the positioning of the die on the wafer is performed, and the die D is bonded on the package area P of the substrate S through the operations of the drive sections of the pickup section 2 and the bonding section 4. The wafer recognition camera 24, the stage recognition camera 32, and the substrate recognition camera 44 used in this case are compatible with gray scale, color, or the like, and digitize light intensities.

Figure 17:
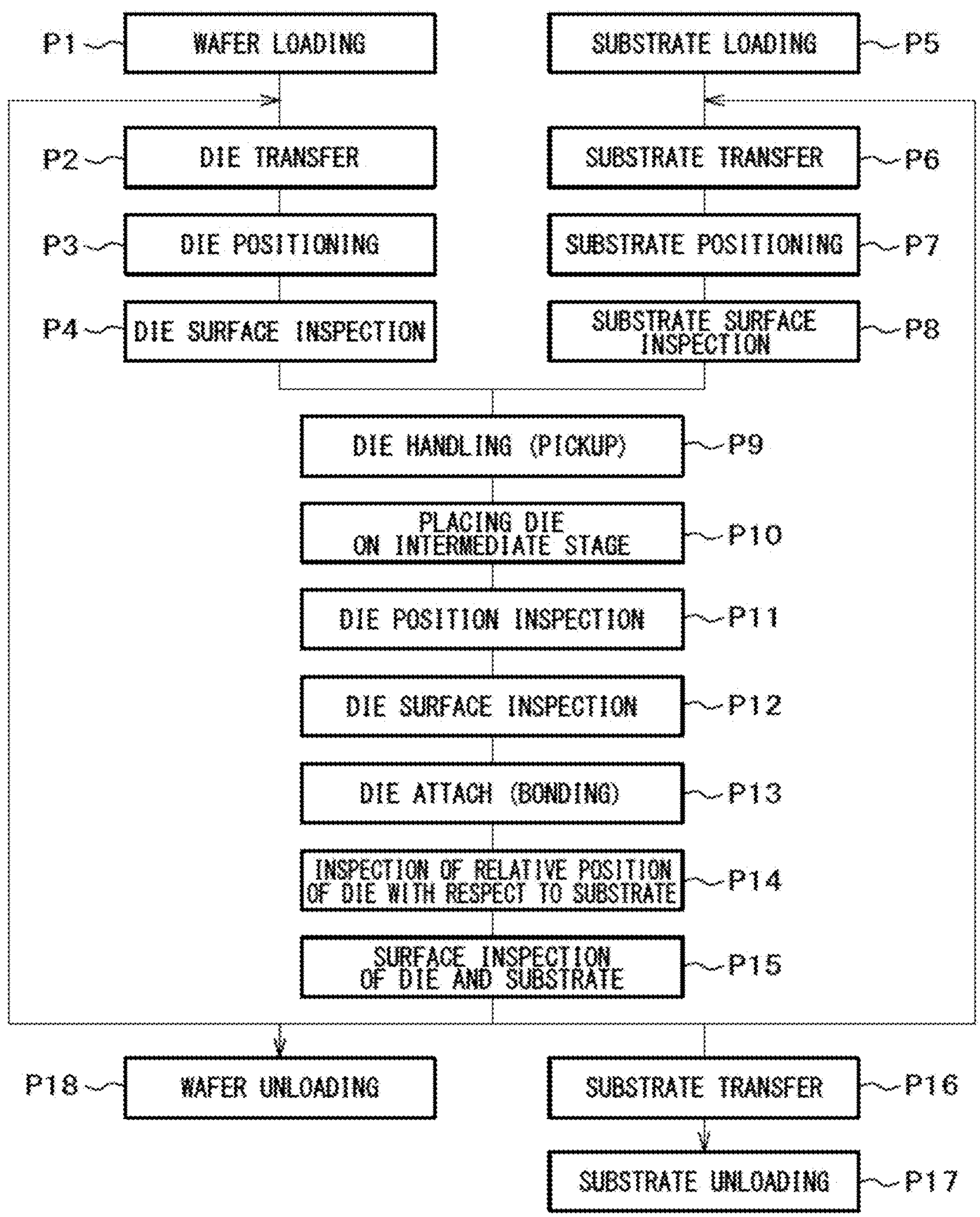
FIG. 17 is a flowchart used for explaining the steps of die bonding in the die bonder shown in FIG. 13.

Next, a die bonding process (a part of a manufacturing method of a semiconductor device) will be explained with reference to FIG. 17. FIG. 17 is a flowchart used for explaining the die bonding process in the die bonder shown in FIG. 13.

In the bonding process in this example, first the wafer ring 14 that holds the dicing tape 16 to which a die D separated from the wafer 11 is attached is stored in a wafer cassette (not shown), and the cassette is carried in the die bonder 10. In addition, a substrate S is prepared and carried in the die bonder 10.

(Wafer Loading: Step P1)

The control section 3 brings out the wafer ring 14 holding the wafer 11 from the wafer cassette, mounts the wafer ring 14 on the wafer holder 12, and transfers the wafer holder 12 to a reference position where a die D is picked up. Next, the control section 3 executes fine adjustment (alignment) so that the disposed position of the wafer 11 accurately coincide with the reference position in consideration of an image obtained by the wafer recognition camera 24.

(Die Transfer: Step P2)

Next, the control section 8 moves the wafer holder 12 on which the wafer 11 is mounted at predefined pitches and keeps the wafer holder horizontal, so that the die D to be picked up first is disposed in the relevant pickup position. Here, the pickup position of the die D is also the recognition position of the die D recognized by the wafer recognition camera 24. As for the inspection of the wafer 11, every die on the wafer is inspected in advance by an inspection device such as a prober, and map data that shows the good or bad for every die is created, and the map data is stored in the storage device 82 of the control section 8. Judgment whether the pickup target die D is good or bad is performed on the basis of the map data. If the die D is bad, the control section 8 moves the wafer holder 12 on which the wafer 11 is mounted at the predefined pitches, and disposes a die D to be picked up next in the relevant pickup position, and skips the bad die D.

(Die Positioning: Step P3)

Next, the control section 8 sets the illumination device of the wafer recognition camera 24 as an illumination device for die positioning. For example, the control section 8 turns on the coaxial illumination 103 for positioning in the embodiment, and turns off the oblique illumination 102 for die crack inspection. The control section 8 photographs the main surface (top surface) of the pickup target die D using the wafer recognition camera 24 and obtains the image of the die D. with reference to the obtained image, the displacement amount of the pickup target die D from the pickup position is calculated, and the position of the die D is measured. The control section 8 moves the wafer holder 12 on which the wafer 11 is mounted on the basis of this displacement amount, and accurately disposes the pickup target die D in the pickup position.

(Die Surface Inspection: Step P4)

Next, the control section 8 executes the surface inspection of the pickup target die D using the image obtained by the wafer recognition camera 24. Here, if the control section 8 judges that there is no problem regarding the surface of the die D, the control section 8 executes the after-mentioned die crack inspection, and then the flow proceeds to the next step (the after-mentioned step P9), but if it is judged that there is any problem, skip processing or error stop processing is executed. In the skip processing, the step P9 and subsequent steps regarding the die D are skipped, and the flow proceeds to the step P2.

The control section 8 stops using the illumination device of the wafer recognition camera 24 and uses the illumination device for die crack inspection. For example, the control section 8 turns off the coaxial illumination 103 for positioning in the embodiment, and turns on the oblique illumination 102 for die crack inspection. The control section 8 photographs the main surface of the pickup target die D using the wafer recognition camera 24, obtains an image, and executes die crack inspection. Here, if the control section 8 judges that there is no problem regarding the surface of the die D, the flow proceeds to the next step (the after-mentioned step P9), but if the control section 8 judges that there is any problem, skip processing or error stop processing is executed. In the skip processing, the step P9 and subsequent steps regarding the die D are skipped, and the flow proceeds to the step P2.

(Substrate Loading: Step P5, Substrate Transfer: Step P6)

The control section 8 mounts a substrate S on the transfer lane 52 using the substrate feed section 6. The control section 8 moves the substrate transfer claws 51, which claw and transfer the substrate S, to the bonding position.

(Substrate Positioning: Step P7)

Next, the control section 3 moves the substrate recognition camera 44 to the photographing position of a bonding target package area P (a bonding tab photographing position). The control section 8 sets the illumination device of the substrate recognition camera 44 as an illumination device for substrate positioning. For example, the control section 8 turns on the coaxial illumination 103 for positioning in the embodiment, and turns off the oblique illumination 102 for die crack inspection. The control section 8 photographs the substrate S using the substrate recognition camera 44, and obtains an image, with reference to the obtained image, the displacement amount of the package area P of the substrate S is calculated, and the position of the substrate S is measured. The control section 3 moves the substrate S on the basis of this displacement amount, and executes positioning to accurately dispose the bonding target package area P in the bonding position.

(Substrate Surface Inspection: Step P3)

Next, the control section 8 executes the surface inspection of the package area P of the substrate S on the basis of the image obtained by the substrate recognition camera 44. Here, the control section 8 judges whether there is any problem in the surface inspection, and if the control section 8 judges that there is no problem regarding the surface of the package area P of the substrate S, the flow proceeds to the next step (the after-mentioned step P9), but if the control section 8 judges that there is any problem, the image of the surface of the package area P is visually checked, or is checked using inspection with higher sensitivity, inspection under a different illumination condition or the like, and if there is any problem just the same, skip processing is executed. If there is no problem, the flow proceeds to the processing of the next step. In the skip processing, the step P13 and subsequent steps regarding the relevant tab of the package area P of the substrate S are skipped, and information to the effect that the surface of the package area P is defective is registered in substrate processing start information.

(Die Handling: Step P9, Placing Die on Intermediate Stage: Step P10)

After accurately disposing the pickup target die D in the pickup position using the die feed section 1, the control section 8 picks up the die D from the dicing tape 16 using the pickup head 21 with the collet 22 and places the die D on the intermediate stage 31.

(Die Position Inspection: Step P11)

The control section 8 detects the postural misalignment (rotational misalignment) of the die placed on the intermediate stage 31 by photographing the die using the stage recognition camera 32. If there is the postural misalignment, the control section 8 turns the intermediate stage 31 in a plane parallel to a mounting plane including the mounting position to correct the postural misalignment using a turning drive device (not shown) fixed to the intermediate stage 31.

(Die Surface Inspection: Step P12)

The control section 8 executes the surface inspection of the die D using an image obtained by the stage recognition camera 32. Here, if the control section 8 judges that there is no problem regarding the surface of the die D, the control section 8 executes die crack inspection, and the flow proceeds to the next step (the after-mentioned step P13), but if the control section 8 judges that there is any problem, skip processing or error stop processing is executed. In the skip processing, after the die is mounted on an unshown defective product tray or the like, the step P13 and subsequent steps regarding the die D are skipped, and the flow proceeds to the step P2.

The control section 8 stops using the illumination device of the stage recognition camera 32 and uses the illumination device for die crack inspection. For example, the control section 8 turns off the coaxial illumination 103 for positioning in the embodiment, and turns on the oblique illumination 102 for die crack inspection. The control section 8 photographs the main surface of the die D placed on the intermediate stage 31 using the stage recognition camera 32, obtains an image, and executes die crack inspection. Here, if the control section 8 judges that there is no problem regarding the surface of the die D, the flow proceeds to the next step (the after-mentioned step P13), but if the control section 8 judges that there is any problem, skip processing or error stop processing is executed. In the skip processing, the step P13 and subsequent steps regarding the die D are skipped, and the flow proceeds to the step P2.

(Die Attach: Step P13)

The control section 8 picks up the die D from the intermediate stage 31 using the bonding head 41 including the collet 42, and bonds the picked-up die D to the package area P of the substrate S or to a die that has already been bonded to the package area P of the substrate S.

(Inspection of Relative Position of Die with respect to Substrate: Step P14)

Next, the control section 3 sets the illumination device of the substrate recognition camera 44 as an illumination device for die positioning. For example, the control section 8 turns on the coaxial illumination 103 for positioning in the embodiment, and turns off the oblique illumination 102 for die crack inspection. The control section 8 photographs the die D using the substrate recognition camera 44 and obtains the image of the die D. With reference to the obtained image, the position of the die D is measured. After bonding the die D, the control section 8 checks whether the position to which the die D is bonded is accurate. In this case, as is the case with the die positioning, the center of the die and the center of the tab are calculated, and it is checked whether the relative position of the center of the die with respect to the center of the tab is accurate.

(Surface Inspection of Die and Substrate: Step P15)

The control section 8 executes the surface inspection of the die D on the basis of the image obtained by the substrate recognition camera 44. Here, if the control section 3 judges that there is no problem regarding the surface of the die D, the flow proceeds to the next step (step P2), but if the control section 8 judges that there is any problem, skip processing or error stop processing is executed. In the skip processing, information to the effect that the surface of the die D is defective is registered in the substrate processing start information, and the flow proceeds to the step P2.

Next, the control section 8 sets the illumination device of the substrate recognition camera 44 as an oblique illumination for die crack inspection. For example, the control section 8 turns off the coaxial illumination 103 for positioning in the embodiment, and turns on the oblique illumination 102 for die crack inspection. The control section 8 photographs the die D using the substrate recognition camera 44, obtains the image of the die D, and executes die crack inspection. Here, if the control section 3 judges that there is no problem regarding the surface of the die D, the flow proceeds to the next step (step P2), but if the control section 8 judges that there is any problem, skip processing or error stop processing is executed. In the skip processing, information to the effect that the surface of the die D is defective is registered in the substrate processing start information, and the flow proceeds to the step P2.

(Substrate Transfer: Step P16, Substrate Unloading: Step P17)

Hereinafter, according to the same procedure as described above, plural dice D are bonded on the same number of package areas of the substrate S on a one-to-one basis. After the bonding for one substrate S is finished, the substrate S is moved to the substrate carrying-out section 7 by the substrate transfer claws 51, and is passed to the substrate carrying-out section 7.

(Wafer Unloading: Step P18)

Hereinafter, according to the same procedure as described above, the dice D are peeled off from the dicing tape 16 one by one (Step P9). After the pickup of all the dice D except for defective dice D is finished, the dicing tape 16 and the wafer ring 14 that hold those dice D on the outer rim of the wafer 11 and the like are unloaded in the wafer cassette.

As described above, the dice D are mounted on the substrate S via die attach films 18 respectively, and are carried out from the die bonder. And then the dice D are electrically connected to the electrodes of the substrate S via Au wires in a wire bonding process. In the case of laminated components being produced, the substrate S on which dice D are mounted is carried in the die bonder again, and second dice D are laminated on the dice D mounted on the substrate S via die attach films 18. After the substrate S on which the dice D and the second dice D are laminated is carried out from the die bonder, the dice D and the second dice D are electrically connected to the electrodes of the substrate S via Au wires respectively in the wire bonding process. After being peeled off from the dicing tape 16 in the abovementioned way, the second dice D are transferred to a pellet bonding process, and are laminated on the already-bonded dice D respectively. After the above processes are repeated predefined times, the substrate S is transferred to a mold process, and plural dice D and Au wires are sealed by mold resin (not shown), so that laminated packages are completed.

The surface crack inspection should be executed in least one place of the die feed section, the intermediate stage, and the bonding stage that are places in each of which die position recognition is executed, and it is more preferable that the surface crack inspection should be executed in all the places. If the surface crack inspection is executed in the die feed section, a crack can be found earlier. If the surface crack inspection is executed at the intermediate stage, a crack that cannot be detected in the die feed section or a crack that occurs after the pickup step (a crack that does not become obvious before the bonding step) can be detected before the bonding. Furthermore, if the surface crack inspection is executed at the bonding stage, a crack that cannot be detected in the die feed section and at the intermediate stage (a crack that does not become obvious before the bonding step) or a crack that occurs after the bonding step can be detected before the next die to be laminated is bonded or before the substrate is carried out.

In the above descriptions, although the disclosure achieved by the disclosers has been explained concretely on the basis of the embodiment and the example, the present disclosure is not limited to the above-described embodiment and example, and it goes without saying that various kinds of alternations can be made.

For example, although the die appearance inspection recognition is executed after the die position recognition in the example, it is conceivable that the die position recognition is executed after the die appearance inspection recognition.

In addition, although DAFs are attached to the rear surface of a wafer in the example, materials to be attached are not limited to the DAFs.

Furthermore, although one pickup head and one bonding head are prepared in the example, it is conceivable that two or more pickup heads and two or more bonding heads are prepared. In addition, although one intermediate stage is prepared in the example, it is conceivable that there is no intermediate stage. In this case, one component may be used as both pickup head and bonding head.

Furthermore, although the bonding is executed on a die with its top surface facing upward in the example, it is conceivable that, after the die is picked up, the die is flipped with its top surface facing downward and its rear surface facing upward, and bonding is executed, in this case, it is unnecessary to prepare the intermediate stage. A device used for the above step is called a flip chip bonder.

In addition, although the bonding head is prepared in the example, it is possible to bond a die without the bonding head. In the case, the picked-up die is mounted on a vessel or the like. A device used for the above step is called a pickup device. Furthermore, it is conceivable that the surface crack inspection in this case is executed in the vessel or the like on which the picked-up die is mounted.

In addition, a preform camera (pre-inspection camera) can be prepared at any point of the transfer lane 52, along which a substrate S is moved, from the substrate feed section 6 to the bonding position. The pre-inspection camera makes it possible to inspect the surface of an already-bonded die (foreign materials and cracks) in and after the second path of a laminated product. The oblique illumination is used for the crack inspection. The coaxial illumination is used for the appearance inspections other than the crack inspection.

Furthermore, an after-inspection camera can be prepared at any point of the transfer lane 52, along which a substrate S is moved, from the bonding position to the substrate carrying-out section 7. The after-inspection camera makes it possible to inspect the surface of an already-bonded die independently of a bonding cycle. The oblique illumination is used for the crack inspection. The coaxial illumination is used for the appearance inspections other than the crack inspection. Herewith, productivity can be improved.

What is claimed is:

1. A die bonding apparatus comprising:

a photographing device for photographing a die;

a first illumination device for irradiating the die with light along an optical axis of the photographing device;

a second illumination device that is located above the first illumination device and irradiates the die with light having a predefined angle with respect to the optical axis; and a control device for controlling the photographing device, the first illumination device, and the second illumination device, wherein the first illumination device includes a first light emitting section having a plane light emitting source, and a semi-transmissive mirror that irradiates a top surface of the die with first irradiation light emitted from the first light emitting section in a cylinder of its own, the second illumination device includes a second light emitting section and a light path control member that limits a light path of second irradiation light emitted from the second light emitting section, and the second illumination device is disposed in such a way that the second irradiation light, the light path of which is limited by the light path control member, passes through the cylinder, and the top surface of the die is irradiated with the second irradiation light, and the control device is configured, in the case where cracks of the die are checked, in such a way that the control device turns off the first illumination device, and turns on the second illumination device, and the top surface of the die is irradiated with the second irradiation light from the second illumination device.

2. The die bonding apparatus according to claim 1, wherein the light path control member is a light path control film, a light shielding louver, a fiber optic plate, an optical lens, a Fresnel lens, or an illumination hood.

3. The die bonding apparatus according to claim 1, wherein the first illumination device further includes a first light path control member that is installed at the side of the semi-transmissive mirror of the first light emitting section and limits the light path of the second irradiation light from the second illumination device.

4. The die bonding apparatus according to claim 3, wherein the first light path control member is a light shielding louver, an illumination hood, or a light path control film.

5. The die bonding apparatus according to claim 3, wherein the first light path control member is a first polarizing filter, and the light path control member is a second polarizing filter a transmission axis of which is orthogonal to a transmission axis of the first polarizing filter.

6. A die bonding apparatus comprising:

a photographing device for photographing a die;

a first illumination device for irradiating the die with light along an optical axis of the photographing device;

a second illumination device that is located above the first illumination device and irradiates the die with light having a predefined angle with respect to the optical axis; and a control device for controlling the photographing device, the first illumination device, and the second illumination device, wherein the first illumination device includes a first light emitting section having a plane light emitting source, and a semi-transmissive mirror that irradiates a top surface of the die with first irradiation light emitted from the first light emitting section in a cylinder of its own, the second illumination device includes a second light emitting section, and the second illumination device is disposed in such a way that second irradiation light emitted from the second light emitting section passes through the cylinder and the top surface of the die is irradiated with the second irradiation light, the first illumination device further includes a light shielding section that shields some of the second irradiation light emitted from the second light emitting section or a first light path control member that limits a light path of the second irradiation light emitted from the second light emitting section, and the control device is configured, in the case where cracks of the die are checked, in such a way that the control device turns off the first illumination device, and turns on the second illumination device, and the top surface of the die is irradiated with the second irradiation light from the second illumination device.

7. The die bonding apparatus according to claim 6, wherein the light shielding section is a light shielding louver, an illumination hood, or a light path control film that is installed at the side of the semi-transmissive mirror of the first light emitting section.

8. The die bonding apparatus according to claim 6, wherein the cylinder includes a ceiling with a window, and the light shielding section is the ceiling including the window that is formed in such a way that the second irradiation light emitted from the second light emitting section is prevented from entering the first light emitting section.

9. The die bonding apparatus according to claim 6, wherein the cylinder includes a ceiling with a window, the light shielding section is the ceiling, and the first light emitting section is disposed in a position where the second irradiation light irradiated from the second light emitting section does not enter the first light emitting section itself.

10. A die bonding apparatus comprising:

a photographing device for photographing a die;

a first illumination device for irradiating the die with light along an optical axis of the photographing device;

a second illumination device that is located above a lower end of the first illumination device and irradiates the die with light having a predefined angle with respect to the optical axis; and a control device for controlling the photographing device, the first illumination device, and the second illumination device, wherein the first illumination device includes a lens, a first light emitting section having a plane light emitting source, and a semi-transmissive mirror that irradiates the top surface of the die with first irradiation light emitted from the first light emitting section in the cylinder of its own, the second illumination device includes a second light emitting section, and the second illumination device is disposed in such a way that second irradiation light, emitted from the second light emitting section does not pass through the cylinder and the top surface of the die is irradiated with the second irradiation light, and the control device is configured, in the case where cracks of the die are checked, in such a way that the control device turns off the first illumination device, and turns on the second illumination device, and the top surface of the die is irradiated with the second irradiation light from the second illumination device.

11. The die bonding apparatus according to claim 1, further comprising a die feed section having a watering holder for holding a dicing tape to which the die is pasted, wherein the control device is configured to photograph the die pasted to the dicing tape using the photographing device, the first illumination device, and the second illumination device.

12. The die bonding apparatus according to claim 1, further comprising a bonding head for bonding the die to a substrate or to a die that has already been bonded to the substrate, wherein the control device is configured to photograph the die bonded on the substrate or on the die that has already been bonded to the substrate using the photographing device, the first illumination device, and the second illumination device.

13. The die bonding apparatus according to claim 1, further comprising:

a pickup head for picking up the die; and an intermediate stage on which the picked-up die is mounted, wherein the control device is configured to photograph the die placed on the intermediate stage using the photographing device, the first illumination device, and the second illumination device.

14. A manufacturing method for a semiconductor device comprising the steps of:

(a) carrying in a substrate to the die bonding apparatus according to claim 1;

(b) carrying in a wafering holder for holding a dicing tape to which a die is pasted;

(c) picking up the die; and (d) bonding the picked-up die to the substrate or to a die that has already been bonded to the substrate.

15. The manufacturing method for a semiconductor device according to claim 14, wherein the step (c) includes a step of placing the picked-up die on an intermediate stage, and the step (d) includes a step of picking up the die that is placed on the intermediate stage.

16. The manufacturing method for a semiconductor device according to claim 14, wherein the step (c) includes a step of photographing the die pasted to the dicing tape using the photographing device, the first illumination device, and the second illumination device of the die bonding apparatus.

17. The manufacturing method for a semiconductor apparatus according to claim 14, wherein the step (d) includes a step of photographing the die bonded to the substrate or bonded to the die that has already been bonded to the substrate using the photographing device, the first illumination device, and the second illumination device of the die bonding apparatus.

18. The manufacturing method for a semiconductor apparatus according to claim 5, wherein the step (d) includes a step of photographing the die placed on the intermediate stage using the photographing device, the first illumination device, and the second illumination device of the die bonding apparatus.

* * * * *